United States Patent
Sun et al.

(10) Patent No.: US 12,426,052 B2
(45) Date of Patent: Sep. 23, 2025

(54) PUCCH REPETITION TO INCREASE THE RELIABILITY OF PUCCH TRANSMISSION

(71) Applicant: Apple Inc., Cupertino, CA (US)

(72) Inventors: Haitong Sun, Irvine, CA (US); Yushu Zhang, Beijing (CN); Huaning Niu, San Jose, CA (US); Hong He, Cupertino, CA (US); Wei Zeng, San Diego, CA (US); Dawei Zhang, Saratoga, CA (US); Chunxuan Ye, San Diego, CA (US); Oghenekome Oteri, San Diego, CA (US); Sigen Ye, Whitehouse Station, NJ (US); Weidong Yang, San Diego, CA (US); Chunhai Yao, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/680,544

(22) Filed: May 31, 2024

(65) Prior Publication Data

US 2024/0323966 A1    Sep. 26, 2024

Related U.S. Application Data

(63) Continuation of application No. 17/438,086, filed as application No. PCT/CN2020/119780 on Oct. 2, 2020, now Pat. No. 12,022,469.

(51) Int. Cl.
*H04W 72/21* (2023.01)
*H04L 1/08* (2006.01)
(Continued)

(52) U.S. Cl.
CPC .............. *H04W 72/21* (2023.01); *H04L 1/08* (2013.01); *H04L 5/001* (2013.01); *H04W 72/0446* (2013.01)

(58) Field of Classification Search
None
See application file for complete search history.

(56) References Cited

U.S. PATENT DOCUMENTS

| | | |
|---|---|---|
| 11,350,416 B2 | 5/2022 | Yang |
| 11,777,555 B2 | 10/2023 | Yamamoto |

(Continued)

FOREIGN PATENT DOCUMENTS

| | | |
|---|---|---|
| CN | 110312315 | 10/2019 |
| CN | 111417204 | 7/2020 |

(Continued)

OTHER PUBLICATIONS

International Search Report for PCT Patent Application No. PCT/CN2020/119780; Jul. 2, 2021.

(Continued)

*Primary Examiner* — Otis L Thompson, Jr.
(74) *Attorney, Agent, or Firm* — Kowert, Hood, Munyon, Rankin & Goetzel, P.C.

(57) ABSTRACT

A user equipment (UE) may increase the reliability of transmission of a Physical Uplink Control Channel (PUCCH) by transmitting repeated copies of the PUCCH, according to a repetition pattern spanning one or more slots. In an intra-slot mode, more than one copy may be transmitted within each configured slot, with or without frequency hopping. The number of copies as well as a temporal gap between the transmission of successive copies may be configured by the network. The repetition pattern may or may not be interrupted by slot boundaries. In an inter-slot mode, one copy is transmitted per configured slot. Different copies may be transmitted in different directions, according to a spatial consistency pattern. The UE may perform repeated transmission of PUCCHs to different Transmis- (Continued)

sion-Reception Points (TRPs) using respectively different timing advances and/or transmit power levels.

20 Claims, 12 Drawing Sheets

(51) Int. Cl.
*H04L 5/00* (2006.01)
*H04W 72/0446* (2023.01)

(56) References Cited

U.S. PATENT DOCUMENTS

| | | | |
|---|---|---|---|
| 12,316,561 B2 * | 5/2025 | Fan | H04L 5/0048 |
| 2013/0176868 A1 | 7/2013 | Gaal | |
| 2018/0359711 A1 * | 12/2018 | Akkarakaran | H04W 52/325 |
| 2019/0223205 A1 * | 7/2019 | Papasakellariou | H04W 72/23 |
| 2019/0296809 A1 | 9/2019 | Li | |
| 2019/0313342 A1 * | 10/2019 | Papasakellariou | H04W 52/325 |
| 2020/0015222 A1 | 1/2020 | Huang | |
| 2020/0092068 A1 | 3/2020 | Yang | |
| 2020/0196343 A1 * | 6/2020 | Marinier | H04L 5/0092 |
| 2020/0205150 A1 | 6/2020 | Cheng | |
| 2020/0221448 A1 | 7/2020 | Park | |
| 2020/0275436 A1 | 8/2020 | Lin | |
| 2020/0351891 A1 | 11/2020 | Hosseini | |
| 2021/0026759 A1 | 1/2021 | House, Jr. | |
| 2021/0029708 A1 | 1/2021 | Khoshnevisan | |
| 2021/0050955 A1 | 2/2021 | Park | |
| 2021/0058922 A1 | 2/2021 | Han | |
| 2021/0100004 A1 | 4/2021 | Yang | |
| 2021/0120559 A1 | 4/2021 | Li | |
| 2021/0203397 A1 | 7/2021 | Xiong | |
| 2021/0297191 A1 | 9/2021 | Takeda | |
| 2021/0336726 A1 | 10/2021 | Takeda | |
| 2021/0392666 A1 | 12/2021 | Huang | |
| 2022/0006575 A1 | 1/2022 | Cozzo | |
| 2022/0007356 A1 | 1/2022 | Lee | |
| 2022/0053483 A1 | 2/2022 | Yoshioka | |
| 2022/0069959 A1 | 3/2022 | Zarifi | |
| 2022/0086032 A1 | 3/2022 | Park | |
| 2022/0086825 A1 | 3/2022 | Huang | |
| 2022/0094389 A1 | 3/2022 | Khoshnevisan | |
| 2022/0094484 A1 | 3/2022 | Babaei | |
| 2022/0095346 A1 | 3/2022 | Khoshnevisan | |
| 2022/0103234 A1 | 3/2022 | Zhou | |
| 2022/0104139 A1 | 3/2022 | Yang | |
| 2022/0116968 A1 | 4/2022 | Choi | |
| 2022/0353024 A1 | 11/2022 | Yin | |
| 2022/0353698 A1 | 11/2022 | Jang | |
| 2022/0385401 A1 | 12/2022 | Jiang | |
| 2023/0023719 A1 | 1/2023 | Ji | |
| 2023/0028762 A1 | 1/2023 | Choi | |
| 2023/0031875 A1 | 2/2023 | Dai | |
| 2023/0060179 A1 | 3/2023 | Yin | |
| 2023/0134803 A1 * | 5/2023 | Khoshnevisan | H04B 7/0408 370/329 |
| 2023/0147122 A1 * | 5/2023 | Canonne-Velasquez | H04L 5/005 370/329 |
| 2023/0171778 A1 | 6/2023 | Kittichokechai | |
| 2023/0180243 A1 | 6/2023 | Chen | |
| 2023/0291523 A1 | 9/2023 | Hasegawa | |
| 2023/0318748 A1 | 10/2023 | Yin | |
| 2023/0319829 A1 | 10/2023 | Yang | |
| 2023/0319846 A1 | 10/2023 | Zhu | |

FOREIGN PATENT DOCUMENTS

| | | |
|---|---|---|
| WO | 2020061171 | 3/2020 |
| WO | 2020065740 | 4/2020 |
| WO | 2021158087 | 8/2021 |

OTHER PUBLICATIONS

Vivo et al. "Support of intra-slot NR-PUCCH repetition"; 3GPP TSG RAN WG1 88bis Meeting R1-1704496; Apr. 7, 2017.
Ericsson "SRS support for MTC"; 3GPP TSG RAN WG1 Meeting #83 R1-156422; Nov. 22, 2015.
Huawei et al. "UE feedback enhancements for HARQ-ACK"; 3GPP TSG RAN WG1 Meeting #102-e RI-2005243; Aug. 28, 2020.
Extended European Search Report for EP Patent Application No. 20955866.7; Aug. 28, 2023.
Spreadtrum Communications "Discussion on enhancements on Multi-TRP for PDCCH, PUCCH and PUSCH"; 3GPP R1-2006258; Aug. 17, 2020.
Nokia et al. "Enhancements for Multi-TRP URLLC schemes"; 3GPP TSG RAN WG1 #102 Meeting R1-2006844; Aug. 17, 2020.
International Search Report for PCT Patent Application No. PCT/CN2020/119778; Jul. 1, 2021.
CATT "Discussion on potential techniques for PUCCH coverage enhancement"; 3GPP TSG RAN WG1 Meeting #102-e R1-2005725; Aug. 28, 2020.
Huawei et al. "Discussion on the potential coverage enhancement solutions for PUCCH"; 3GPP TSG RAN WG1 Meeting #102-e R1-2005273; Aug. 28, 2020.
Fujitsu "Enhancements on Multi-TRP for PUCCH and PUSCH"; 3GPP TSG RAN WG1 Meeting #102-e R1-2005542; Aug. 28, 2020.
Intel Corporation "Discussion on potential techniques for PUCCH coverage enhancement"; 3GPP TSG RAN WG1 #102-e R1-2007175; Aug. 28, 2020.
Extended European Search Report for EP Patent Application No. 20955864.2; Oct. 13, 2023.
Qualcomm Inc. "Enhancements on Multi-TRP for PDCCH, PUCCH and PUSCH"; 3GPP TSG-RAN WG1 Meeting #102e R1-2006791; Aug. 17, 2020.
Office Action for JP Patent Application No. 2023-519978; Mar. 11, 2024.
WILUS Inc. "Discussion on potential techniques for PUCCH coverage enhancement"; 3GPP TSG RAN WG1 #102-e R1-2006893; Aug. 17, 2020.
LG Electronics "Enhancements on Multi-TRP for PDCCH, PUCCH and PUSCH"; 3GPP TSG RAN WG1 #102-e R1-2006597; Aug. 17, 2020.
Office Action for CN 202080105779.7; Jun. 5, 2025.

* cited by examiner

- A number of different PUCCH formats
    - Format 0: 1-2 symbols; 1-2 bits payload
    - Format 1: ≥ 4 symbols; 1-2 bits payload
    - Format 2: 1-2 symbols; > 2 bits payload
    - Format 3: ≥ 4 symbols; > 2 bits payload
    - Format 4: ≥ 4 symbols; > 2 bits payload
- PUCCH slot aggregation is allowed
    - RRC configured *nrofSlots* in *PUCCH-FormatConfig* in *PUCCH-Config*
- PUCCH beam can be changed via MAC-CE
    - RRC can configure a list of *PUCCH-SpatialRelationInfo* in *PUCCH-Config*
- MAC-CE can be used to activate a particular beam for a particular PUCCH resource
    - Only one beam can be configured for one PUCCH resource

FIG. 8

| R | Serving Cell ID | | BWP ID |
|---|---|---|---|
| R | PUCCH Resource ID | | |
| Repetition Number | | | |

FIG. 12

1400 transmit a plurality of repetitions of a Physical Uplink Control Channel (PUCCH) over one or more slots  1410

1500 receive, from a user equipment (UE), a plurality of repetitions of a Physical Uplink Control Channel (PUCCH) over one or more slots  1510

PUCCH REPETITION TO INCREASE THE RELIABILITY OF PUCCH TRANSMISSION

PRIORITY CLAIM INFORMATION

This application is a continuation application of U.S. application Ser. No. 17/438,086, filed on Sep. 10, 2021, titled "PUCCH Repetition to Increase the Reliability of PUCCH Transmission," which is a U.S. national stage application of International Application No. PCT/CN2020/119780, filed on Oct. 2, 2020, titled "PUCCH Repetition to Increase the Reliability of PUCCH Transmission," each of which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present disclosure relates to the field of wireless communication, and more particularly, to mechanisms enabling a user equipment device to transmit multiple repetitions of a Physical Uplink Control Channel (PUCCH), to increase the reliability of the PUCCH transmission.

DESCRIPTION OF THE RELATED ART

To increase the reliability of a transmission, a wireless device may repeat the transmission a number of times. A receiving device may accumulate the repeated transmissions (assuming it knows when the transmissions occur), and thus, achieve an increased likelihood of successful decoding of the transmission payload.

SUMMARY

In one set of embodiments, a method for operating a user equipment (UE) device may be performed as follows. The method may include transmitting a plurality of repetitions of a Physical Uplink Control Channel (PUCCH) over one or more slots. The one or more slots to be used for said transmitting may be configured by a base station.

In some embodiments, two or more of the repetitions may occur in a first of the one or more slots. Furthermore, a second of the one or more slots may include two or more of the repetitions.

In some embodiments, the one or more slots may comprise a plurality of slots. In one or more of these embodiments, a time between successive repetitions of the plurality of repetitions is constant and not interrupted at slot boundaries.

In some embodiments, the one or more slots may comprise a plurality of slots. In one or more of these embodiments, a time between successive repetitions of the plurality of repetitions is constant within each of the slots, and none of the repetitions of the plurality of repetitions straddles a slot boundary.

In some embodiments, a mode of transmitting the plurality of repetitions is determined by a Radio Resource Control (RRC) configuration message received from a network element.

In some embodiments, the RRC configuration message also indicates a time offset between successive repetitions of the plurality of repetitions.

In some embodiments, the method may also include receiving configuration information enabling frequency hopping, wherein said transmitting the plurality of repetitions of the PUCCH is performed in response to said receiving.

In some embodiments, the method may also include, prior to said transmitting the plurality of repetitions, transmitting to a network (e.g., to a base station) an indication of whether the UE can ensure phase continuity when the transmit power changes between successive repetitions of said plurality of repetitions.

In some embodiments, the method may also include, prior to said transmitting the plurality of repetitions, transmitting to a network an indication of whether the UE can ensure phase continuity when the transmit power changes within a repetition of the plurality of repetitions.

In some embodiments, the method may also include, prior to said transmitting the plurality of repetitions, transmitting to a network an indication of whether the UE can ensure phase continuity when duplexing direction changes between successive repetitions of the plurality of repetitions.

In some embodiments, the method may also include receiving a Medium Access Control (MAC) message from a network that dynamically configures the UE to perform said transmitting the plurality of repetitions of the PUCCH. The MAC message may include a number of the repetitions of the PUCCH to be transmitted by the UE.

In some embodiments, the MAC message may also include the cell ID of a serving cell to which the UE is to transmit the repetitions.

In some embodiments, the MAC message may also include identification of a bandwidth part in which the UE is to transmit the repetitions.

In some embodiments, the MAC message may also include a PUCCH resource ID for a PUCCH resource that is to be used by the UE to transmit the repetitions.

In some embodiments, the MAC message is used by the UE to update more than one PUCCH resource with said number of repetitions.

In some embodiments, the MAC message is used by the UE to update all PUCCHs in a plurality of component carriers (CCs) with said number of repetitions.

In some embodiments, the MAC message is used by the UE to update all PUCCHs in a plurality of bandwidth parts with said number of repetitions.

In some embodiments, said transmitting a plurality of repetitions of the PUCCH may include transmitting N repetitions of the PUCCH. The N repetitions of the PUCCH may be partitioned into M segments, with each of the M segments including a corresponding K of the N repetitions. Different segments of the M segments may be associated with different beams or precodings. For each segment, the K repetitions within the segment may be transmitted with the associated beam or precoding.

In some embodiments, M and K are configured by configuration information received from a network element (e.g., a base station such as a gNB or an eNB).

In some embodiments, the method may also include transmitting a preferred value of M and a preferred value of K to the network (e.g., to a base station of the network) prior to said transmitting N repetitions of the PUCCH. The network may select values of M and K using the preferred values, and transmit an indication of the selected values to the UE, prior to said transmitting N repetitions of the PUCCH. The UE configures itself to use the selected value when transmitting the N repetitions.

In some embodiments, said transmitting the plurality of repetitions of the PUCCH may be performed according to an inter-slot repetition mode and a short PUCCH format.

In some embodiments, when a format of the PUCCH is a long format, the UE may be configurable to perform said transmitting according to an intra-slot repetition mode or an inter-slot repetition mode.

In some embodiments, when a format of the PUCCH is a long format, the UE may be configurable to perform said transmitting only according to an inter-slot repetition mode.

In some embodiments, when a format of the PUCCH is a long format, the UE may be configurable to perform said transmitting according to an inter-slot repetition mode or according to an intra-slot repetition mode if the number of symbols in the PUCCH is less than a threshold value.

In some embodiments, when a format of the PUCCH is a short format, the UE may be configurable to perform said transmitting according to an intra-slot repetition mode or an inter-slot repetition mode.

In some embodiments, when a format of the PUCCH is a short format, the UE may be configurable to perform said transmitting only according to an intra-slot repetition mode.

In some embodiments, the method may also include, after transmitting the (first) plurality of repetitions of the (first) PUCCH, transmitting a second plurality repetitions of a second PUCCH in one or more additional slots. The first plurality of repetitions of the first PUCCH may be transmitted using a first set of transmission parameters, and the second plurality of repetitions of the second PUCCH may be transmitted using a second set of transmission parameters.

In some embodiments, the method may also include receiving configuration information indicating the first set and second set of transmission parameters.

In some embodiments, the first set of transmission parameters may include a first timing advance and/or a first transmission power, and the second set of transmission parameters may include a second timing advance and/or a second transmission power.

BRIEF DESCRIPTION OF THE DRAWINGS

A better understanding of the present subject matter can be obtained when the following detailed description of the preferred embodiment is considered in conjunction with the following drawings.

FIG. 8 illustrates a number of features associated with transmission of a Physical Uplink Control Channel (PUCCH), according to some embodiments.

FIG. 12 illustrates the structure of a Medium Access Control-Control Element for dynamic configuration of a number of PUCCH repetitions, according to some embodiments.

Figure 1:
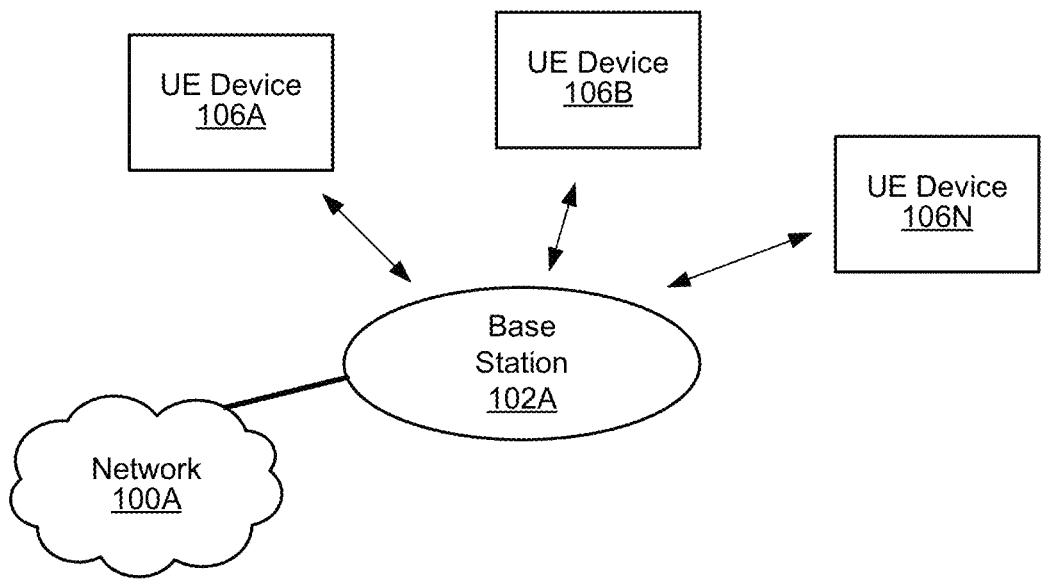
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: 5th Generation New Radio
BW: Bandwidth
BWP: Bandwidth Part
CQI: Channel Quality Indictor
DCI: Downlink Control Information
DL: Downlink
eNB (or eNodeB): Evolved Node B, i.e., the base station of 3GPP LTE
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Media Access Control
MAC-CE: MAC Control Element
NR: New Radio
NR-DC: NR Dual Connectivity
NW: Network
RAT: Radio Access Technology
RLC: Radio Link Control
RLF: Radio Link Failure
RLM: Radio Link Monitoring
RNTI: Radio Network Temporary Identifier RRC: Radio Resource Control
RRM: Radio Resource Management
RS: Reference Signal
SR: Scheduling Request
SSB: Synchronization Signal Block
UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
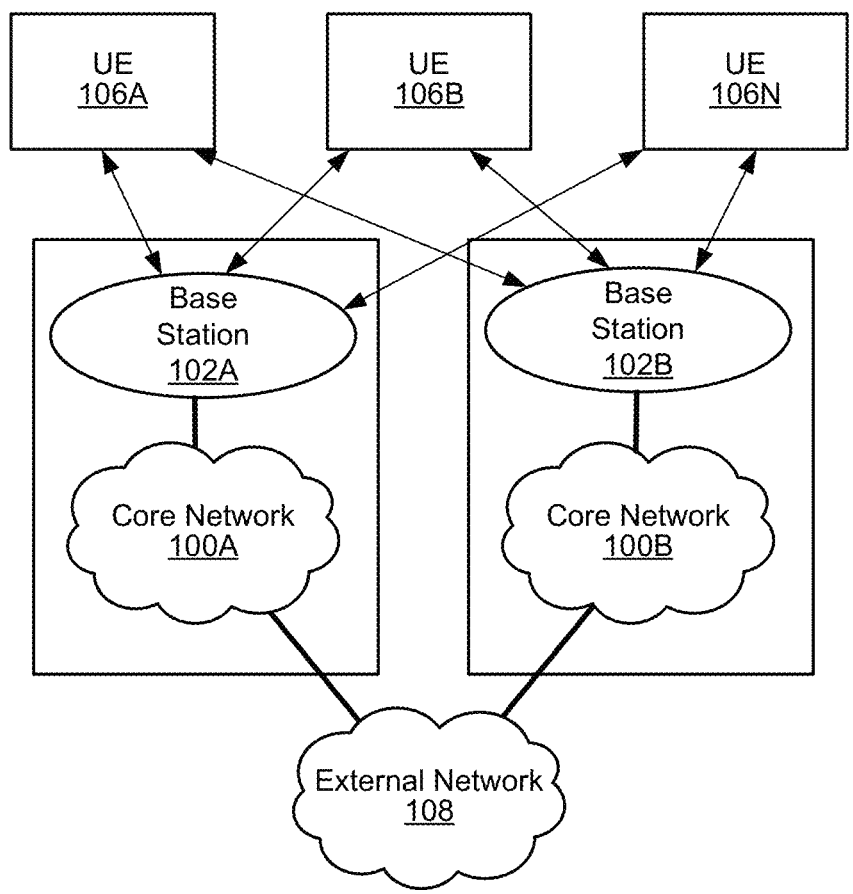
Figure 3:
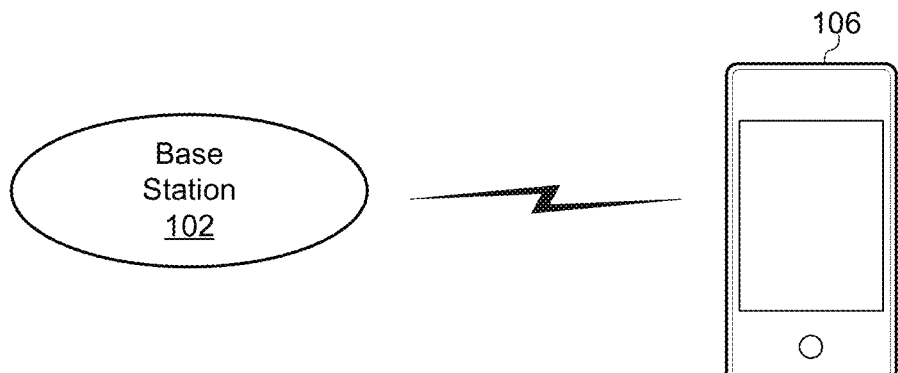
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, CHRPD), Wi-Fi, WiMAX etc.

For example, base station 102A and core network 100A may operate according to a first cellular communication standard (e.g., LTE) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., LTE and CDMA 1×RTT, GSM and UMTS, or any other combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). As another example, a UE 106 might be configured to communicate using different 3GPP cellular communication standards (such as two or more of GSM, UMTS, LTE, or LTE-A). Thus, as noted above, a UE 106 might be configured to communicate with base station 102A (and/or other base stations) according to a first cellular communication standard (e.g., LTE) and might also be configured to communicate with base station 102B (and/or other base stations) according to a second cellular communication standard (e.g., one or more CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, cHRPD, etc.), LTE, LTE-A, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
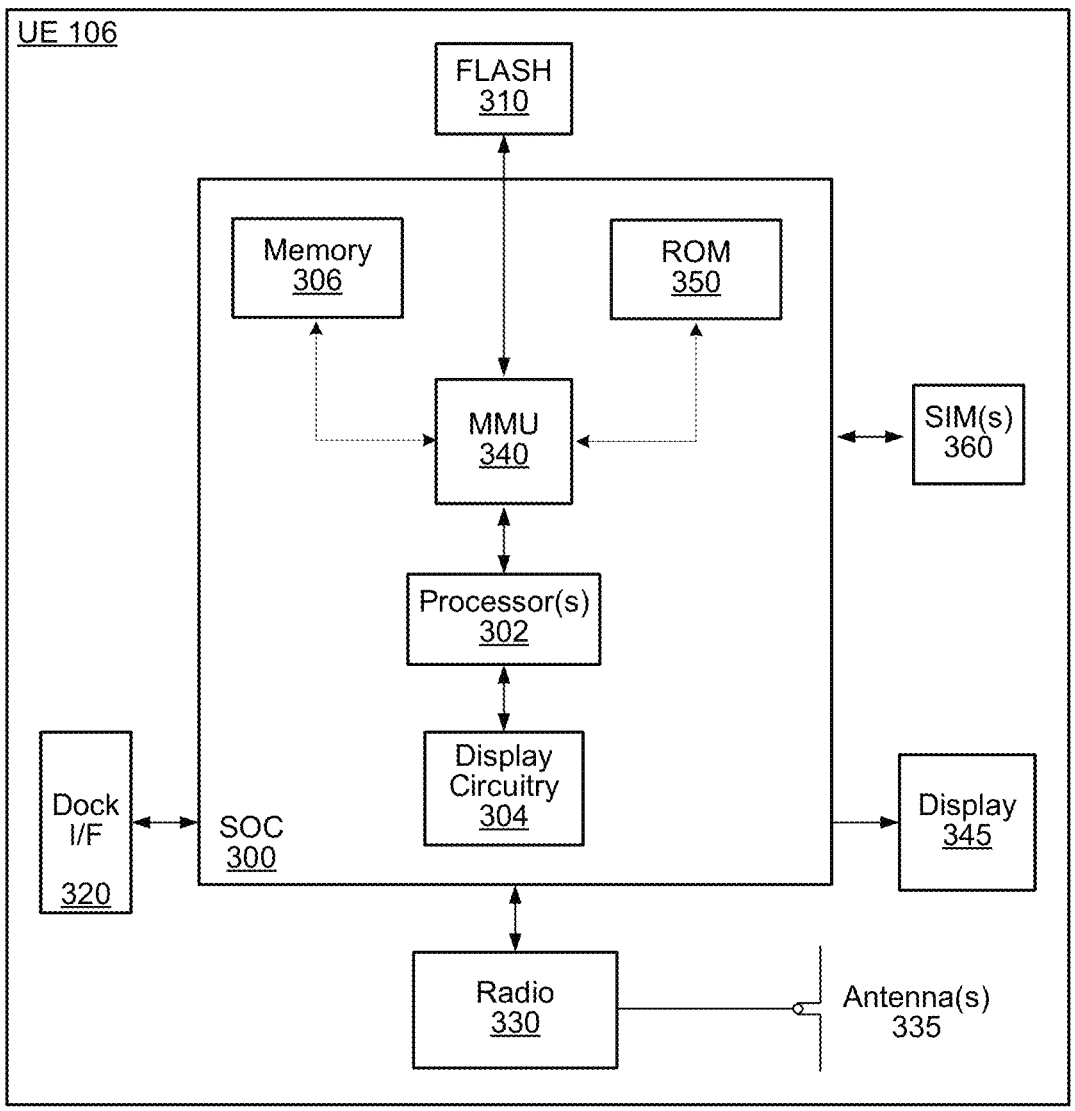
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMS 360 may be implemented as removeable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
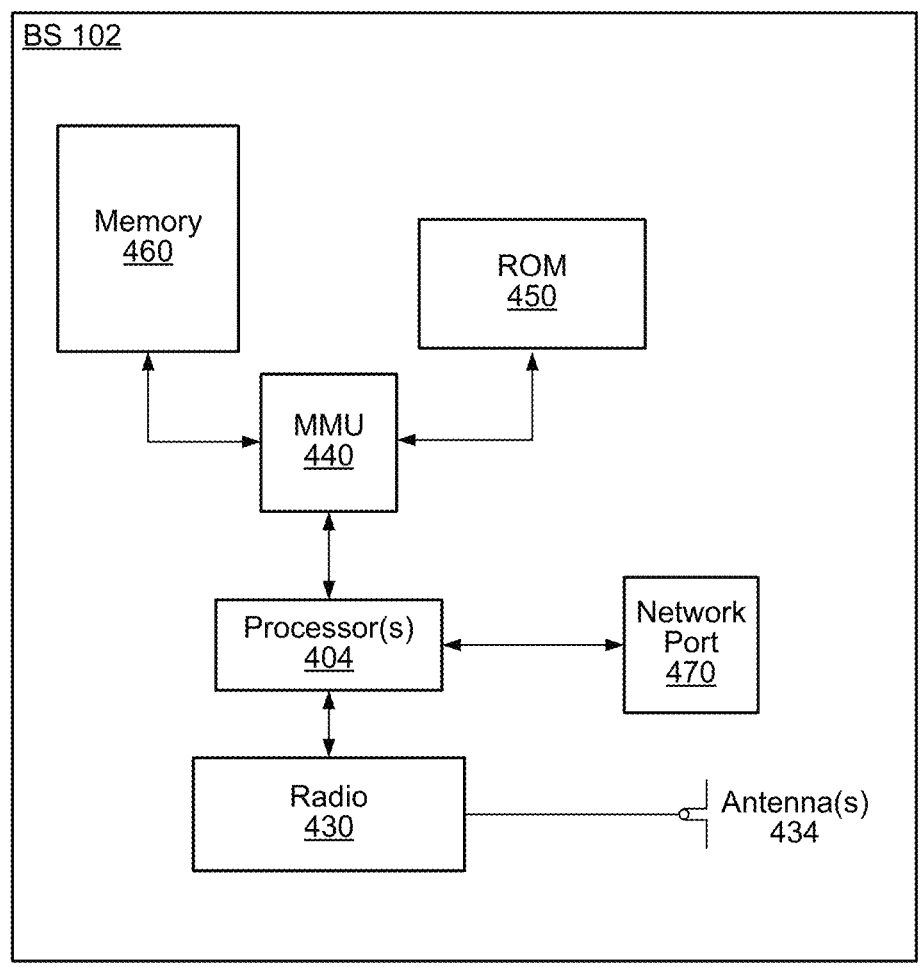
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Figure 6:
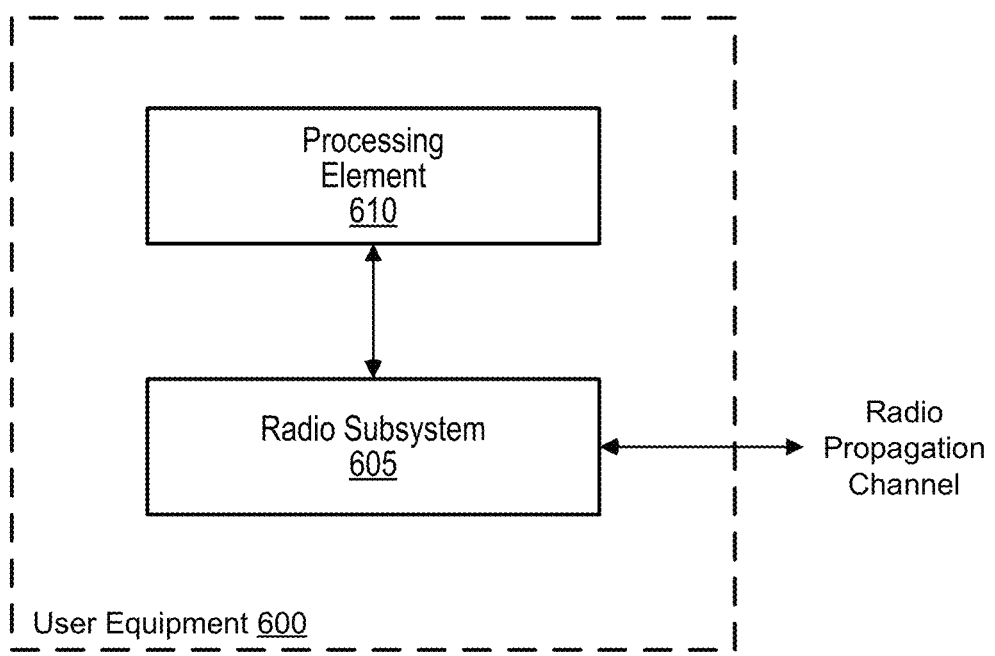
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or, one or more arrays of antennas) to facilitate signal transmission and reception. Each RF chain (or, some of the RF chains) may be tunable to a desired frequency, thus allowing the RF chain to receive or transmit at different frequencies at different times.

The processing element 610 may be coupled to the radio subsystem, and may be configured as variously described above. (For example, processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Figure 7:
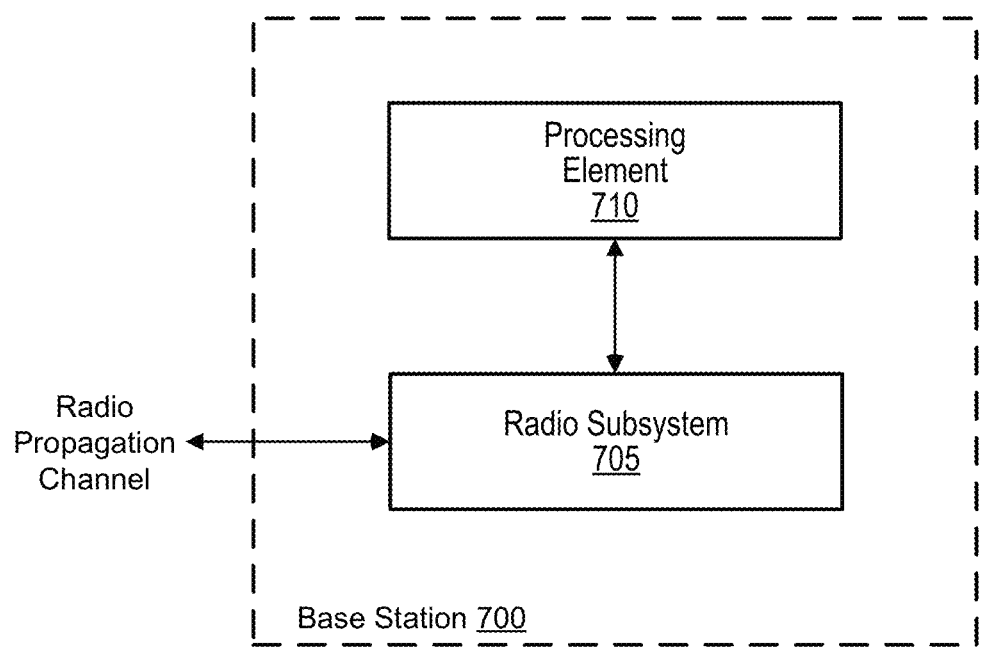
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 710 may include one or more RF chains. Each RF chain may be tunable to a desired frequency, thus allowing the RF chain to receive or transmit at different frequencies at different times. The radio subsystem 710 may be coupled to an antenna subsystem, including one or more antennas, e.g., an array of antenna, or a plurality of antenna arrays. The radio subsystem may employ the antenna subsystem to transmit and receive radio signals to/from radio wave propagation medium.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

The processing element 710 may be configured to perform any of the base station method embodiments described herein.

Enhancing the Reliability of PUCCH Transmission

In some embodiments, as shown in FIG. 8, a system design for the Physical Uplink Control Channel (PUCCH) may include one or more of the following features. First, the system design may allow a number of different PUCCH formats, e.g., to accommodate different types of UEs, or different application scenarios. Second, slot aggregation may be allowed for transmission of the PUCCH. Third, a beam used by the UE to transmit the PUCCH may be changed via dynamic signaling to the UE, e.g., via a Medium Access Control-Control Element (MAC-CE). Fourth, a MAC-CE may be used to activate a particular beam for a particular PUCCH resource.

Each of the PUCCH formats may have a corresponding constraint on the number of symbols over which the PUCCH is to be transmitted and a corresponding constraint on the number of payload bits to be carried in the PUCCH. The formats may be divided into two categories with respect to duration: Short and Long. For example, in the Formats of FIG. 8, Format 0 and Format 2 are short formats since they are transmitted over 1 or 2 symbols; and the remaining formats are long formats since they are transmitted over four or more symbols.

When PUCCH slot aggregation is employed, a PUCCH may be transmitted repeatedly over a number of slots, with each slot including only one repetition of the PUCCH. (In alternative embodiments, each slot may include more than one repetition of the PUCCH.) The parameter nrofSlots may be configured by signaling from the network, e.g., by Radio Resource Control (RRC) signaling. In one embodiment, nrofSlots may configured as part of PUCCH-FormatConfig in PUCCH-Config.

In some embodiments, the UE may apply a beam to each repetition of the PUCCH. Different beams may be applied to different repetitions. The network may change the PUCCH beam used by the UE, e.g., by sending a MAC CE to the UE. Radio Resource Control (RRC) signaling (to the UE) may be used to configure a list of PUCCH-SpatialRelationInfo in PUCCH-Config, e.g., a list of beams or precoders to be used for PUCCH transmission. (The UE includes an array of antennas. An uplink signal may be transmitted with different weights through different antennas of the array, to achieve beamforming or precoded transmission. The vector of weights applied to the signal determines the beam direction.) The UE stores the list. The MAC CE may be used to select or activate one of the beams in the list. In an alternative embodiment, the MAC CE may be used to select or active more than one of the beams in the list.

In some embodiments, the MAC CE may be used to select or activate a particular beam for a particular PUCCH resource. In one embodiment, only one beam may be configured for a PUCCH resource. In other embodiments, more than one beam may be configured for a PUCCH resource.

In some embodiments, the UE may be configured for multi-TRP operation. TRP is an acronym for "Transmission-Reception Point". A TRP is a node capable of transmission and reception. In the present context, multi-TRP operation implies that the UE is configured for communication with a plurality of nodes such as macro-cells, small cells, pico-cells, femto-cells, remote radio heads, relay nodes, etc. For example, a UE may be configured to communicate with two base stations in parallel (e.g., with two gNBs or two eNBs), each of which hosts one or more cells.

In some embodiments, for multi-TRP operation, the reliability of a Physical Downlink Shared Channel (PDSCH) may be enhanced by one employing one or more enhancement mechanisms. For example, PDSCH aggregation (e.g., over multiple slots) may be employed for downlink transmission to the UE, and may be dynamically controlled via Downlink Control Information (DCI) transmitted by a TRP such as a base station. As another example, multiple beams may be configured for the same PDSCH with multiple transmission occasions.

In some embodiments, the reliability of PUCCH transmission may be enhanced by employing one or more of the enhancement mechanisms herein described. The enhancement mechanisms may be employed, e.g., in the context of multi-TRP operation. Alternatively, the enhancement mechanisms may be employed in the context of single TRP operation, if desired.

In some embodiments, a network element (e.g., a TRP such as a base station) may provide an indication of PUCCH repetition to the UE. In response to receiving the indication, the UE may configured itself to perform repeated transmissions of a PUCCH.

In some embodiments, a system design may take into consideration issues related to existing PUCCH formats, e.g., the PUCCH formats that exist as part of the 3GPP 5G NR standard.

In some embodiments, a system design may enhance the use of PUCCH spatial relation.

In some embodiments, a system design may enhance PUCCH power control.

It may be observed that N repetitions of a long format PUCCH may provide better coverage (or higher probability of successful PUCCH decode at a TRP) than N repetitions of a short format PUCCH, assuming that both formats carry the same number of payload bits.

When performing slot aggregation for PUCCH transmissions, latency may be an issue, especially in the context of multi-TRP operation. For example, the UE may be required to transmit a separate PUCCH to each of $n_{TRP}$ TRPs. Thus, if the UE is constrained to transmit only one PUCCH repetition per slot, and is configured with nrofSlots slots per PUCCH, the UE may require $$nrofSlots \cdot n_{TRP}$$

slots to complete the transmissions of $n_{TRP}$ PUCCHs to the $n_{TRP}$ respective TRPs, assuming temporally consecutive transmissions of the PUCCH transmissions. Thus, it is desirable to decrease the latency of PUCCH transmissions to TRPs. One mechanism of achieving such a decrease is to allow the transmission of a plurality of repetitions of a PUCCH within each configured slot.

Indication of PUCCH Repetition

Figure 9:
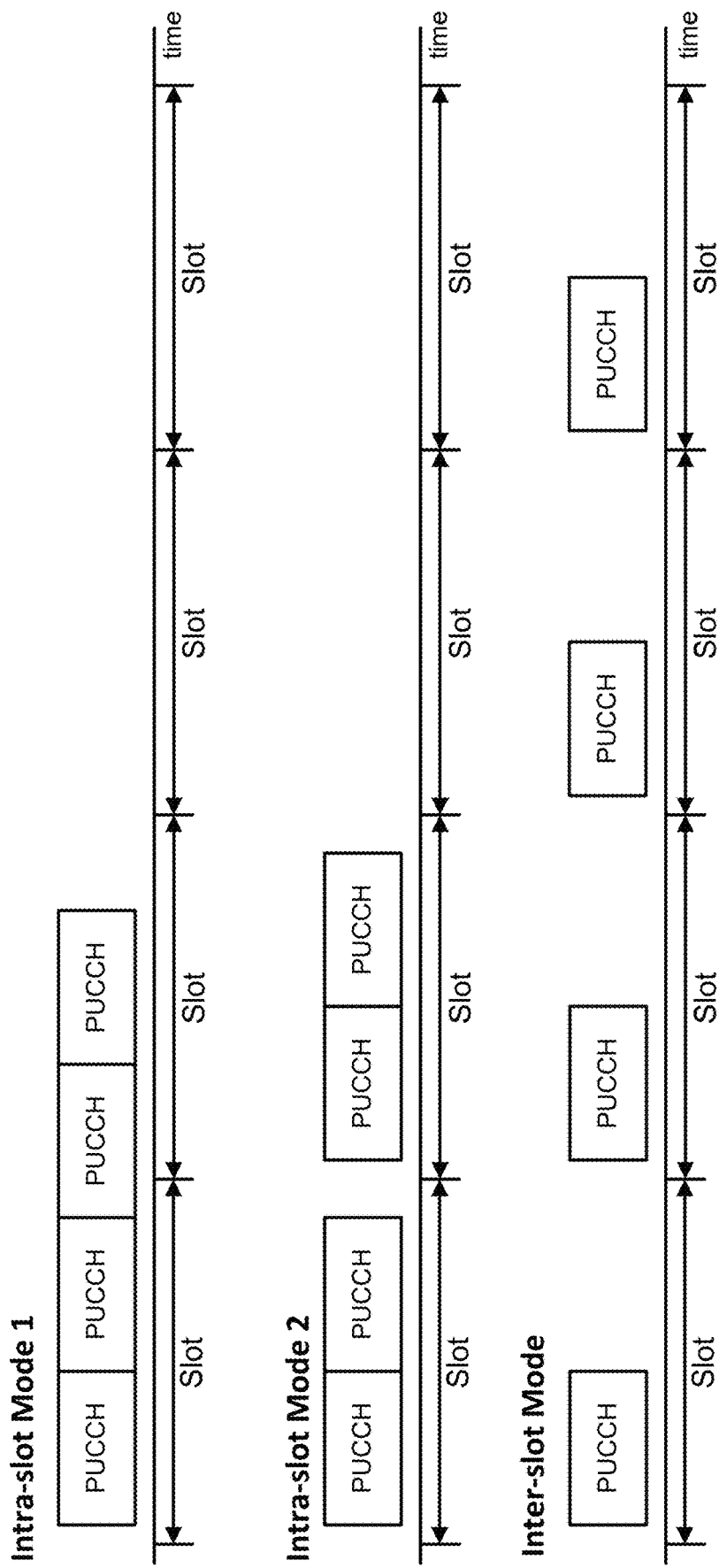
FIG. 9 illustrates two intra-slot modes and an inter-slot mode for PUCCH repetition, according to some embodiments.

In some embodiments, when PUCCH repetition is scheduled, the UE is allowed to operate in different PUCCH repetition modes. For example, an element of the network (e.g., a TRP such as a base station) may select one of the PUCCH repetition modes, and signal the selected mode to the UE. The PUCCH repetition modes may include one or more intra-slot modes and one or more inter-slot modes, e.g., as shown in FIG. 9.

The UE may be scheduled (or configured) to repeatedly transmit the PUCCH according to a pattern that spans one or more slots. In an inter-slot mode, only one repetition of the PUCCH is transmitted in each of the configured slots. In an intra-slot mode, more than one repetition of the PUCCH may occur within each slot configured slot.

In some embodiments of intra-slot repetition, successive repetitions of a PUCCH may occur back to back, i.e., with no delay between the end of one repetition and the beginning of the next. In other embodiments of intra-slot repetition, a configured offset (or gap) may occur between successive repetitions of a PUCCH.

In a first intra-slot mode (Mode 1), the repetition pattern is not interrupted at slot boundaries. Thus, a repetition of the pattern may straddle a slot boundary. Or more generally, one or more of the repetitions in the repetition pattern may straddle one or more respective slot boundaries.

In a second intra-slot mode (Mode 2), the repetition pattern is interrupted at slot boundaries. None of the repetitions of the pattern is allowed to straddle a slot boundary. For example, the repetition pattern may be generated by repeating a subpattern in each of the configured slots. Each repetition of the subpattern occurs within the corresponding slot. The subpattern may include two or more repetitions of the PUCCH.

In an inter-slot repetition mode, repetitions of the PUCCH may be transmitted so that one repetition occurs in each of nrofSlots consecutive slots. Within each slot, the same time domain allocation may be used for transmission of the respective PUCCH repetition.

In some embodiments, the PUCCH repetition mode can be configured by RRC signaling transmitted from the network (e.g., from a base station) to the UE. For example, the PUCCH repetition mode may be signaled as part of the PUCCH-Config. (To accommodate signaling of the PUCCH repetition mode, the present patent disclosure contemplates modification of the PUCCH-Config as defined by the existing 3GPP 5G NR standard.) PUCCH-Config is a hierarchical data structure that includes one or more instances of PUCCH-FormatConfig. Each PUCCH-FormatConfig includes information for the configuration of a corresponding PUCCH format. For example, each instance of PUCCH-FormatConfig may include one or more PUCCH-Resource elements, to configure one or more respective PUCCH resources for the PUCCH format. (In this context, "resources" are resources in the time frequency domain.)

In some embodiments, the PUCCH repetition mode may be signaled as part of PUCCH Config, but not part of any PUCCH-FormatConfig. Thus, the PUCCH repetition mode may apply to all PUCCH resources of all PUCCH formats.

In other embodiments, the PUCCH repetition mode may be signaled as part of a PUCCH-FormatConfig, but not part of any PUCCH-Resource element. Thus, the PUCCH repetition mode may apply to all the PUCCH resources configured for the PUCCH format indicated by the PUCCH-FormatConfig. Different PUCCH formats may be configured with different repetitions modes.

In other embodiments, the PUCCH repetition mode may be signaled as part of a PUCCH-Resource element, and thus, may apply to the corresponding PUCCH resource, but not to other PUCCH resources belonging to the same PUCCH format. Different PUCCH resources may be configured with different PUCCH repetition modes.

In some embodiments, the following information element (IE) may be transmitted by a network element (e.g., by a base station) to the UE, and used to configure the PUCCH repetition mode. The UE may employ the configured PUCCH repetition mode when transmitting repetitions of a PUCCH. A TRP (e.g., a base station) may then know which PUCCH resources contains the transmitted PUCCH repetitions, and thus, capture and accumulate those repetitions. The accumulation of repetitions allows the TRP to experience an increase in signal-to-noise ratio (SNR) in the PUCCH reception, and thereby, an improvement in the reliability of decoding the PUCCH.

In some embodiments, the information element may include an intraSlotRepetition field that indicates one of the intra-slot repetition modes. In the context where there are two intra-slot repetition modes, e.g., as described above, the intraSlotRepetition field may be defined by:

intraSlotRepetition ENUMERATED{mode1,mode2}.

The notation "X ENUMERATED $\{Y_1, Y_2, Y_3, \ldots, Y_L\}$" indicates that X is selected from the set $\{Y_1, Y_2, Y_3, \ldots, Y_L\}$.

In some embodiments, the information element may also include an intraslotRepetitionOffset field that indicates the value of an offset (or gap) between successive repetitions of the PUCCH in an intra-slot repetition mode. The value may be selected from a range of the form $\{0, 1, 2, \ldots, \text{Offset}_{MAX}\}$, where $\text{Offset}_{MAX} \leq n_{SPS}$ or $\text{Offset}_{MAX} \leq n_{SPS}-1$, or $\text{Offset}_{MAX} \leq n_{SPS}-2$, where $n_{SPS}$ is the number of symbols per slot. For example, in the context where the number of symbols per slot is 14, the intraslotRepetitionOffset field may be defined by:

intraslotRepetitionOffset INTEGER(0 . . . Offset-$_{MAX}$), where $\text{Offset}_{MAX} \leq 13$.

Figure 10:
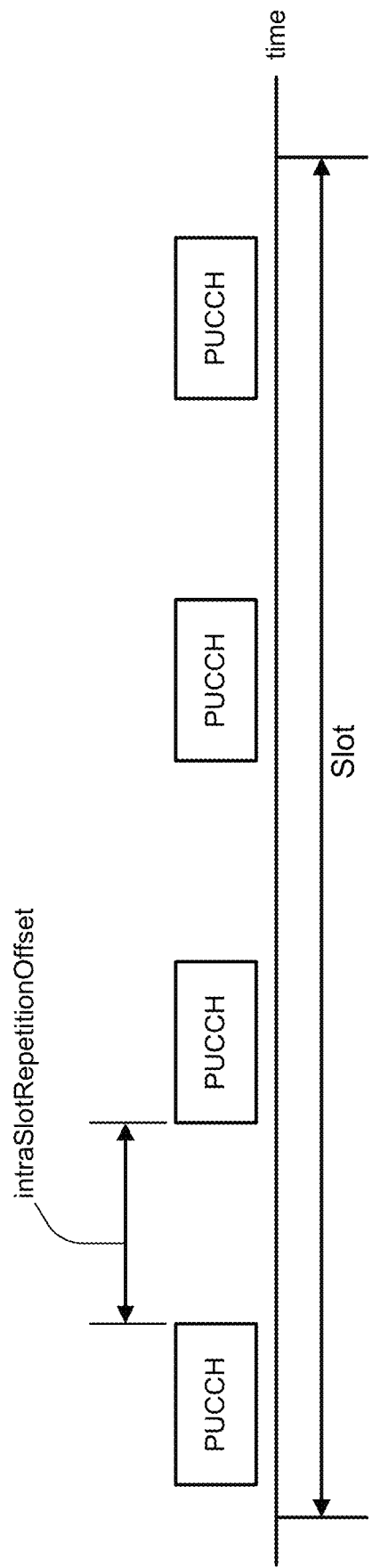
FIG. 10 illustrates a repetition offset between successive repetitions of a PUCCH, according to some embodiments.

FIG. 10 illustrates an example of an intra-slot repetition offset. While FIG. 10 illustrates a repetition pattern that occurs within one slot, it should be noted that a repetition pattern in an intra-slot mode may cover more than one slot, if configured by the network. In intra-slot mode 1, the offset between successive repetitions of the repetition pattern may be respected regardless of slot boundaries. In intra-slot mode 2, the offset between successive repetitions may be respected within each slot, but be disrupted at slot boundaries. (As noted above, in intra-slot mode 2, PUCCH repetitions are not allowed to straddle slot boundaries.)

In some embodiments, the information element may include an interSlotRepetition field that indicates whether or not the inter-slot repetition mode is enabled:

interSlotRepetition ENUMERATED{enabled}.

The UE may initialize the inter-slot repetition mode to the disabled state. A TRP (such as a base station) may enable the inter-slot repetition mode by sending the interSlotRepetition field to the UE.

Figure 11:
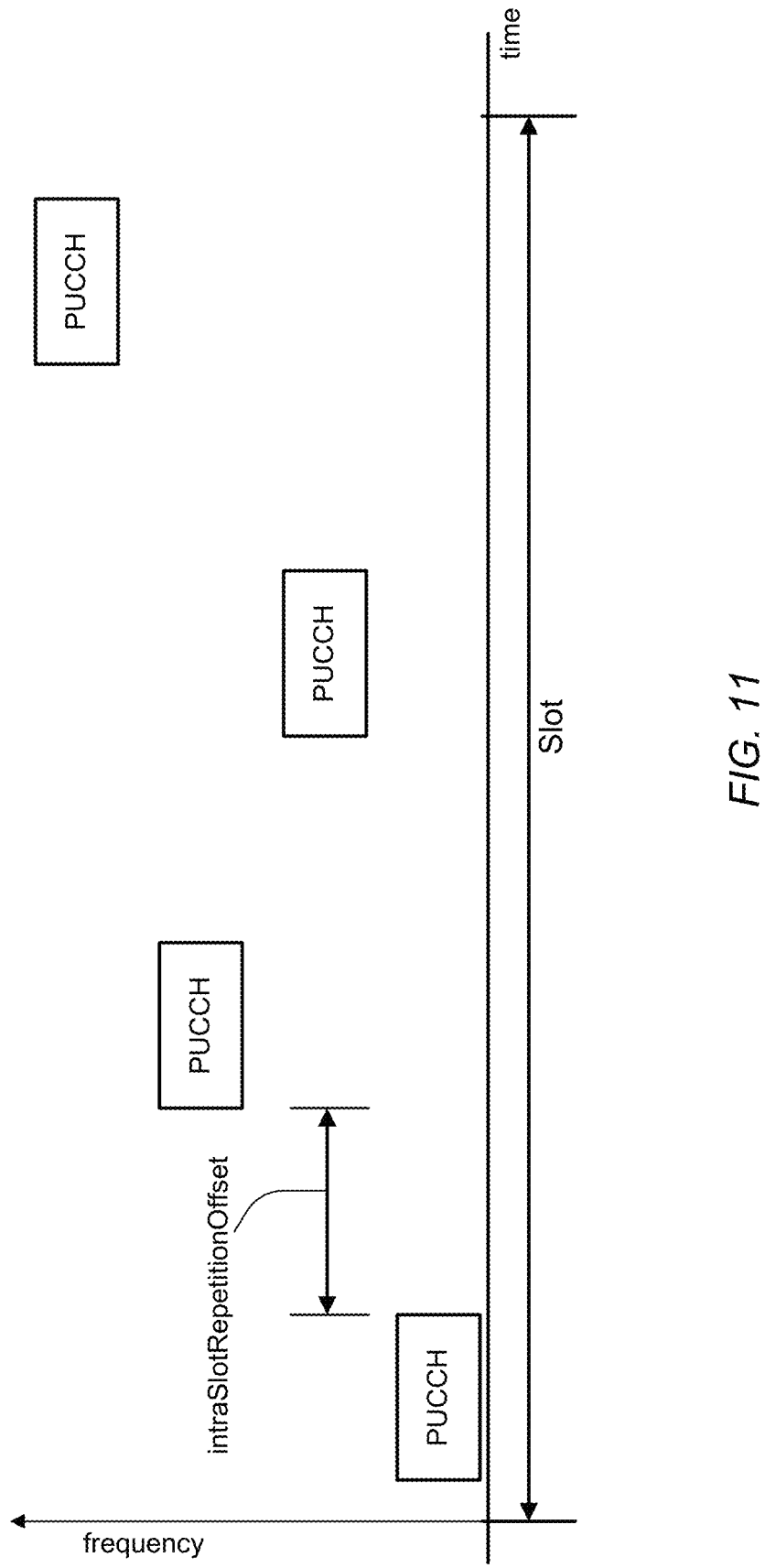
FIG. 11 illustrates frequency hopping in an intra-slot mode of PUCCH repetition, according to some embodiments.

In some embodiments, when PUCCH intra-slot repetition is configured, intra-slot frequency hopping may be configured. Intra-slot frequency hopping involves changing the frequency between successive repetitions of the PUCCH, according to a configured (or predefined) frequency hopping pattern. The UE transmits repetitions of the PUCCH at respective frequencies defined by the frequency hopping pattern. For example, FIG. 11 illustrates frequency hopping for a repetition pattern including four repetitions of the PUCCH within one slot. The horizontal axis is time, and the vertical axis is frequency.

The PUCCH intra-slot frequency hopping may be configured, e.g., by RRC signaling to the UE. Similar to the above discussion of RRC signaling to configured the PUCCH repetition mode, PUCCH intra-slot frequency hopping may be signaled in one of three places: (a) in PUCCH-Config, but not in any particular PUCCH-FormatConfig; (b) in a PUCCH-FormatConfig, but not in any particular PUCCH-Resource element; or (c) in a PUCCH-Resource element. Option (a) would configure frequency hopping for all PUCCH resources of all PUCCH formats. Option (b) would configure frequency hopping for all PUCCH resources of the PUCCH format corresponding to the PUCCH-FormatConfig. Option (c) would configure frequency hopping for the PUCCH resource corresponding to the PUCCH-Resource element, but not for other PUCCH resources of the PUCCH format.

The following information element (IE) may be used to configure PUCCH intra-slot frequency hopping:

intraslot FrequencyHopping
ENUMERATED{enabled}.

The UE may initialize intra-slot frequency hopping to the disabled state. To enable intra-slot frequency hopping, a network element (e.g., a TRP such as a base station) may set the intraslotFrequencyHopping IE equal to the enabled state.

In some embodiments, the number of PUCCH repetitions can be changed (e.g., dynamically changed) using a MAC-CE. A network element (e.g., a TRP such as a base station) may transmit a MAC-CE to the UE to change the number of PUCCH repetitions in a PUCCH repetition pattern. FIG. 12 illustrates one possible structure for such a MAC-CE. However, a wide variety of other structures may be employed. The MAC-CE may include one or more or all of the following: a serving cell ID, an indication of a bandwidth part (BWP), a PUCCH resource ID, and a repetition number. (The repetition number is the number of PUCCH repetitions in the repetition pattern.) The MAC-CE may also include one or more reserved bits. (R denotes a reserved bit.)

In one particular embodiment, the serving cell ID may be 5 bits in length, the BWP indication may be 2 bits in length, the PUCCH resource ID may be 7 bits in the length, and the repetition number may be 8 bits in length. However, it should be understood that each of the above mentioned fields of the MAC-CE may take any of a variety of different values, e.g., depending on application scenario, channel conditions, interference environment, or network configuration.

In some embodiments, a MAC-CE format may be used to update a plurality of PUCCH resources with the same number of PUCCH repetitions or different numbers of PUCCH repetitions. For example, the network may configure a list of PUCCH resources to be used (or potentially used) for PUCCH repetition. When the list is configured, and one of the PUCCH resources in the list is indicated in the MAC-CE (e.g., in the PUCCH Resource ID field of the MAC-CE), the UE may update all the PUCCH resources of the list to use the same number of PUCCH repetitions when it transmits PUCCH repetitions on any of those PUCCH resources.

In some embodiments, a MAC-CE format may be used to update all PUCCHs in a list of component carriers (CCs)

with the same number of PUCCH repetitions. For example, the network may configure a list of component carriers for use (or potential use) by the UE. When the component carrier list is configured, and one of the component carriers in the list is indicated in the MAC-CE (e.g., in the Serving Cell ID field of the MAC-CE), the UE may update all the component carriers of the list to use the same number of PUCCH repetitions when it transmits PUCCH repetitions on any of those component carriers.

In some embodiments, a MAC-CE format may be used to update all PUCCHs in all BWPs in a list of BWPs with the same number of PUCCH repetitions. For example, the network may configure a list of BWPs for use (or potential use) by the UE. When the list is configured, and one of the BWPs in the list is indicated in the MAC-CE (e.g., the BWP indication field of the MAC-CE), the UE may update all the BWPs of the list to use the same number of PUCCH repetitions when it transmits PUCCH repetitions on any of those BWPs.

In some embodiments, PUCCH slot aggregation may be allowed for short PUCCH formats (e.g., PUCCH formats 0 and 2 of FIG. 8) as well as long PUCCH formats.

In some embodiments, one of the following restrictions may be applied to intra-slot PUCCH repetition and/or inter-slot PUCCH repetition.

In some embodiments, for long PUCCH formats (e.g., formats 1, 3 and 4 of FIG. 8), there may be three alternatives. In a first alternative, a network is allowed to use both intra-slot and inter-slot PUCCH repetition. (Different UEs may be configured to use different repetition modes. For example, one UE may be configured to use intra-slot repetition while another UE is configured to use inter-slot repetition. Furthermore, a UE may be configured to use both intra-slot repetition and inter-slot repetition, e.g., for different long PUCCH formats.) In a second alternative, the network is only allowed to use inter-slot repetition. In a third alternative, the network is allowed to use at least inter-slot repetition; and if the number of symbols in a PUCCH of long format is less than X, it can also use intra-slot repetition.

In some embodiments, for short PUCCH formats (e.g., formats 0 and 2), there may be two alternatives. In a first alternative, the network is allowed to use both intra-slot and inter-slot PUCCH repetition. In a second alternative, the network is only allowed to use intra-slot repetition.

In some embodiments, when PUCCH repetition is configured, the base station (e.g., the gNB or eNB) may configure PUCCH spatial consistency patterns to allow the UE to perform precoding cycling or beam cycling, to achieve better reliability.

Figure 13:
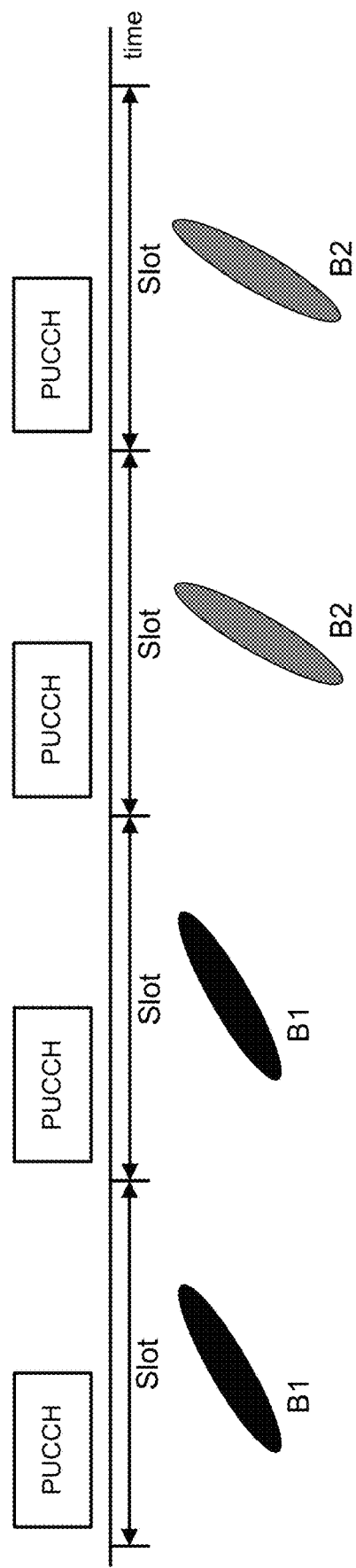
FIG. 13 illustrates an example of spatial consistency in the transmission of PUCCH repetitions, according to some embodiments.

In some embodiments, the total number N of PUCCH repetitions can be divided into M segments, with each segments containing K PUCCH repetitions: N=M*K. The K PUCCH repetitions of a segment need not occur back to back (i.e., with zero offset between repetitions) in the time domain. The PUCCH repetitions within a segment may use the same beam (or precoding). (This property of using the same beam/precoding within a segment is a form of spatial consistency.) However, the PUCCH repetitions within a different segment may use a different beam (or different precoding). In other words, different segments may use respectively different beams (or different precodings). FIG. 13 illustrates an example with two segments, each with two PUCCH repetitions: M=2, K=2. The first and second PUCCH repetitions use a beam B1. The third and fourth PUCCH repetitions use a beam B2, different from B1.

In some embodiments, the network (NW) may configure the repetition pattern by signaling the (M, K) parameter pair to the UE, e.g., via RRC signaling, MAC-CE signaling, or DCI signaling. (DCI is an acronym for Downlink Control Information.)

In some embodiments, when the base station (e.g., gNB) is allowed to configure the PUCCH spatial consistency patterns to allow the UE to perform precoding/beam cycling (to achieve better reliability), the UE may indicate to the gNB the preferred (M, K) configuration. The base station (or a network element) may select a PUCCH spatial consistency pattern taking the preferred (M,K) configuration into account, and signal the selected pattern to the UE.

In some embodiments, the UE may inform the base station (e.g., the gNB or eNB) whether the UE can ensure phase continuity when the total transmit power changes between two PUCCH repetitions or when the total transmit power changes within a PUCCH repetition.

In some embodiments, transmit power control information may be updated (by the base station) at the beginning of each slot (or at the beginning of certain slots), and thus, the transmit power level of the UE may change at slot boundaries. The UE's transmitter might not be able to maintain phase continuity across a slot boundary where the transmit power changes. Such phase discontinuity may occur, e.g., when two repetitions of the PUCCH separated by a slot boundary, or when a PUCCH repetition that straddles a slot boundary in intra-slot mode 1.

In some embodiments, the UE may inform the base station (e.g., the gNB or ENB) whether the UE can ensure phase continuity when the UE experiences a change in duplexing direction between two PUCCH repetitions. For example, the duplexing direction may change from uplink to downlink, and then back to uplink. In other words, two successive PUCCH repetitions, which are by definition uplink transmissions, may be separated by a period of downlink transmission. The UE's transmitter may or may not be able to maintain phase continuity across such intervening periods of downlink transmission.

In some embodiments, when PUCCH repetition is configured, each TRP of a plurality of TRPs (e.g., base stations) may be logically configured to map to a corresponding group of PUCCH repetition occasions. For each TRP, the UE may transmit a corresponding PUCCH to the TRP using the corresponding group of PUCCH repetition occasions. Each group may be configured with a corresponding timing advance and/or a corresponding power control level. The UE transmits the PUCCH to the TRP using the corresponding timing advance and/or the corresponding power control level. (The power control level determines or influences the transmit power.) The TRPs may have different distances to the UE. Thus, different timing advances and different transmission powers may be use to perform transmission of PUCCH repetitions to different TRPs.

In some embodiments, for each group of PUCCH repetition occasions, the following information elements (IEs) may be independently configured: a timing advance (TA) for uplink transmission; and PUCCH-PowerControl.

Figure 14:
FIG. 14 illustrates a method for operating a user equipment to transmit PUCCH repetitions, according to some embodiments.

In one set of embodiments, a method 1400 for operating a user equipment (UE) device may include the operations shown in FIG. 14. (The method 1400 may also include any subset of the features, elements or operations described above.) The method may be performed by processing circuitry of the UE device, e.g., by the processing element 610 of user equipment 600.

At 1410, the method may include transmitting a plurality of repetitions of a Physical Uplink Control Channel (PUCCH) over one or more slots. For example, the processing circuitry may direct the radio subsystem 605 (of FIG. 6)

to transmit the plurality of repetitions. The one or more slots used for said transmitting may be configured by a network element, e.g., by a base station such as a gNB or eNB.

In some embodiments, two or more of the repetitions may occur in a first of the one or more slots. Furthermore, a second of the one or more slots may include two or more of the repetitions. See the above discussion of "intra-slot repetition", e.g., in connection with the intra-slot modes 1 and 2 of FIG. 9.

In some embodiments, the one or more slots may comprise a plurality of slots. In one or more of these embodiments, a time between successive repetitions of the plurality of repetitions is constant and not interrupted at slot boundaries, e.g., as discussed above in connection with "intra-slot repetition mode 1".

In some embodiments, the one or more slots may comprise a plurality of slots. In one or more of these embodiments, a time between successive repetitions of the plurality of repetitions is constant within each of the slots, and none of the repetitions of the plurality of repetitions straddles a slot boundary, e.g., as discussed above in connection with "intra-slot repetition mode 2".

In some embodiments, a mode of transmitting the plurality of repetitions is determined by a Radio Resource Control (RRC) configuration message received from a network element, e.g., as variously discussed above.

In some embodiments, the RRC configuration message also indicates a time offset between successive repetitions of the plurality of repetitions.

In some embodiments, the method 1400 may also include receiving configuration information enabling frequency hopping, wherein said transmitting the plurality of repetitions of the PUCCH is performed in response to said receiving.

In some embodiments, the method 1400 may also include, prior to said transmitting the plurality of repetitions, transmitting to a network (e.g., to a base station) an indication of whether the UE can ensure phase continuity when the transmit power changes between successive repetitions of said plurality of repetitions. If the UE cannot ensure such phase continuity, the base station may independently perform the PUCCH estimation for different portions of the PUCCH repetition pattern when UE transmission phase may change between different portions due to transmit power change and/or duplexing direction change. Conversely, if the UE can ensure such phase continuity, the base station may jointly perform the PUCCH estimation using different portions of the PUCCH repetition pattern for better estimation accuracy.

In some embodiments, the method 1400 may also include, prior to said transmitting the plurality of repetitions, transmitting to a network an indication of whether the UE can ensure phase continuity when the transmit power changes within a repetition of the plurality of repetitions.

In some embodiments, the method 1400 may also include, prior to said transmitting the plurality of repetitions, transmitting to a network an indication of whether the UE can ensure phase continuity when duplexing direction changes between successive repetitions of the plurality of repetitions.

In some embodiments, the method 1400 may also include receiving a Medium Access Control (MAC) message from a network that dynamically configures the UE to perform said transmitting the plurality of repetitions of the PUCCH, e.g., as variously described above. The MAC message may include a number of the repetitions of the PUCCH to be transmitted by the UE.

In some embodiments, the MAC message may also include the cell ID of a serving cell to which the UE is to transmit the repetitions.

In some embodiments, the MAC message may also include identification of a bandwidth part in which the UE is to transmit the repetitions. A bandwidth part is a contiguous portion of the bandwidth of a carrier. The carrier bandwidth may include one or more configured bandwidth parts (up to maximum number of bandwidth parts).

In some embodiments, the MAC message may also include a PUCCH resource ID for a PUCCH resource that is to be used by the UE to transmit the repetitions.

In some embodiments, the MAC message is used by the UE to update more than one PUCCH resource with said number of repetitions.

In some embodiments, the MAC message is used by the UE to update all PUCCHs in a plurality of component carriers (CCs) with said number of repetitions.

In some embodiments, the MAC message is used by the UE to update all PUCCHs in a plurality of bandwidth parts with said number of repetitions.

In some embodiments, said transmitting a plurality of repetitions of the PUCCH may include transmitting N repetitions of the PUCCH. The N repetitions of the PUCCH may be partitioned into M segments, with each of the M segments including a corresponding K of the N repetitions, e.g., as variously described above. Different segments of the M segments may be associated with different beams or precodings. For each segment, the K repetitions within the segment may be transmitted with the associated beam or precoding. See, e.g., the above discussion in connection with FIG. 13.

In some embodiments, M and K are configured by configuration information received from a network element (e.g., a base station such as a gNB or an eNB).

In some embodiments, the method 1400 may also include transmitting a preferred value of M and a preferred value of K to the network (e.g., to a base station of the network) prior to said transmitting N repetitions of the PUCCH. The network may select values of M and K using the preferred values, and transmit an indication of the selected values to the UE, prior to said transmitting N repetitions of the PUCCH. The UE configures itself to use the selected value when transmitting the N repetitions.

In some embodiments, said transmitting the plurality of repetitions of the PUCCH is performed according to an inter-slot repetition mode and a short PUCCH format.

In some embodiments, when a PUCCH format of the PUCCH referred to at 1410 is a long format, the UE is configurable to perform said transmitting according to an intra-slot repetition mode or an inter-slot repetition mode.

In some embodiments, when a PUCCH format of the PUCCH referred to at 1410 is a long format, the UE is configurable to perform said transmitting only according to an inter-slot repetition mode.

In some embodiments, when a PUCCH format of the PUCCH referred to at 1410 is a long format, the UE is configurable to perform said transmitting according to an inter-slot repetition mode or according to an intra-slot repetition mode if the number of symbols in the PUCCH is less than a threshold value.

In some embodiments, when a PUCCH format of the PUCCH referred to at 1410 is a short format, the UE is configurable to perform said transmitting according to an intra-slot repetition mode or an inter-slot repetition mode.

In some embodiments, when a PUCCH format of the PUCCH referred to at 1410 is a short format, the UE is configurable to perform said transmitting only according to an intra-slot repetition mode.

In some embodiments, the method 1400 may also include, after transmitting the plurality of repetitions of the PUCCH, transmitting a second plurality repetitions of a second PUCCH in one or more additional slots. (The plurality of repetitions referred to at 1410 may be referred to here as the first plurality, to distinguish from the second plurality; and the PUCCH referred to at 1410 may be referred to here as the first PUCCH, to distinguish from the second PUCCH.) The first plurality of repetitions of the first PUCCH may be transmitted using a first set of transmission parameters, and the second plurality of repetitions of the second PUCCH may be transmitted using a second set of transmission parameters.

In some embodiments, the method may also include receiving configuration information indicating the first set and second set of transmission parameters, e.g., as variously described above.

In some embodiments, the first set of transmission parameters may include a first timing advance and/or a first transmission power, and the second set of transmission parameters may include a second timing advance and/or a second transmission power.

Figure 15:
FIG. 15 illustrates a method for operating a base station to receive PUCCH repetitions, according to some embodiments.

In one set of embodiments, a method 1500 for operating a base station (BS) may include the operations shown in FIG. 15. (The method 1500 may also include any subset of the features, elements or operations described above.) The method may be performed by processing circuitry of the base station, e.g., by the processing element 710 of base station 700. The base station may be realized, e.g., by an eNB of 3GPP LTE or by a gNB of 3GPP 5GNR.

At 1510, the method 1500 may include receiving, from a user equipment (UE), a plurality of repetitions of a Physical Uplink Control Channel (PUCCH) over one or more slots. The base station may configure to the one or more slots to be used for said transmitting the PUCCH repetitions, e.g., by sending configuration information to the UE.

The base station may accumulate the received repetitions of the PUCCH (or a subset thereof) to obtain an resultant signal, and decode the resultant signal to recover the payload bits of the PUCCH. The accumulation of repetitions allows the base station to experience a higher probability of successful decoding of the payload bits than if decoding were based on a single transmission of the PUCCH.

In some embodiments, two or more of the repetitions may occur in a first of the one or more slots. Furthermore, a second of the one or more slots may include two or more of the repetitions. See the above discussion of "intra-slot repetition", e.g., in connection with the intra-slot modes 1 and 2 of FIG. 9.

In some embodiments, the one or more slots may comprise a plurality of slots. In one or more of these embodiments, a time between successive repetitions of the plurality of repetitions of the plurality of repetitions is constant and not interrupted at slot boundaries, e.g., as discussed above in connection with "intra-slot repetition mode 1".

In some embodiments, the one or more slots may comprise a plurality of slots. In one or more of these embodiments, a time between successive repetitions of the plurality of repetitions is constant within each of the slots, and none of the repetitions of the plurality of repetitions straddles a slot boundary, e.g., as discussed above in connection with "intra-slot repetition mode 2".

In some embodiments, the method 1500 may include transmitting a Radio Resource Control (RRC) configuration message to the UE. The RRC configuration message may direct the UE to transmit the plurality of repetitions of the PUCCH, e.g., as variously described above.

In some embodiments, the RRC configuration message may also indicate a time offset between successive repetitions of the plurality of repetitions.

In some embodiments, the method 1500 may also include transmitting configuration information to the UE, where the configuration information directs the UE to perform said transmitting the plurality of repetitions with frequency hopping, e.g., as variously described above.

In some embodiments, the method 1500 may also include, prior to said receiving the plurality of repetitions, receiving, from the UE, an indication of whether the UE can ensure phase continuity when the UE's transmit power changes between successive repetitions of said plurality of repetitions.

In some embodiments, the method 1500 may also include, prior to said receiving the plurality of repetitions, receiving, from the UE, an indication of whether the UE can ensure phase continuity when the UE's transmit power changes within a repetition of the plurality of repetitions.

In some embodiments, the method 1500 may also include, prior to said receiving the plurality of repetitions, receiving, from the UE, an indication of whether the UE can ensure phase continuity when duplexing direction changes between successive repetitions of the plurality of repetitions.

In some embodiments, the method 1500 may also include transmitting, to the UE, a Medium Access Control (MAC) message that dynamically configures the UE to transmit the plurality of repetitions of the PUCCH, e.g., as variously described above. The MAC message may include a number of repetitions of the PUCCH to be transmitted by the UE.

In some embodiments, the MAC message may also include the cell ID of a serving cell to which the UE is directed to transmit the repetitions.

In some embodiments, the MAC message may also include identification of a bandwidth part in which the UE is to transmit the repetitions.

In some embodiments, the MAC message may also include a PUCCH resource ID for a PUCCH resource that is to be used by the UE to transmit the repetitions.

In some embodiments, the MAC message may direct the UE to update more than one PUCCH resource with said number of repetitions.

In some embodiments, the MAC message may direct the UE to update all PUCCHs in a plurality of component carriers (CCs) with said number of repetitions.

In some embodiments, the MAC message may direct the UE to update all PUCCHs in a plurality of bandwidth parts with said number of repetitions.

In some embodiments, said receiving a plurality of repetitions of the PUCCH may include receiving N repetitions of the PUCCH. The N repetitions of the PUCCH may be partitioned into M segments, with each of the M segments including a corresponding K of the N repetitions. Different segments of the M segments may be associated with different beams or precodings. See, e.g., FIG. 13 and the associated description.

In some embodiments, for each of the M segments, the base station may independently estimate the PUCCH based on the K repetitions of that segment. In other embodiments, the base station may estimate the PUCCH from the K repetitions of the segment whose average signal power level (or signal-to-noise ratio) is the largest. More generally, the base station may order the segments according to average signal power level (or signal-to-noise ratio), and independently estimate the PUCCH from each of the one or more segments whose average signal power level (or signal-to-noise ratio) are the largest. In yet other embodiments, the base station may estimate the PUCCH based on K repetitions of a selected one of the segments, e.g., a segment that has been signaled to the UE prior to the transmission of the PUCCH repetitions.

In some embodiments, the method 1500 may also include transmitting configuration information to the UE prior to said receiving N repetitions of the PUCCH, where the configuration information indicates M and K to the UE.

In some embodiments, the method 1500 may also include receiving a preferred value of M and a preferred value of K from the UE prior to said receiving N repetitions of the PUCCH.

In some embodiments, said receiving the plurality of repetitions of the PUCCH is performed according to an inter-slot repetition mode and a short PUCCH format.

In some embodiments, when a format of the PUCCH is a long format, the base station is operable to configure the UE to transmit the plurality of repetitions of the PUCCH according to an intra-slot repetition mode or an inter-slot repetition mode.

In some embodiments, when a PUCCH format of the PUCCH is a long format, the base station is operable to configure the UE to transmit the plurality of repetitions of the PUCCH only according to an inter-slot repetition mode.

In some embodiments, when a format of the PUCCH is a long format, the base station is operable to configure the UE to transmit the plurality of repetitions of the PUCCH according to an inter-slot repetition mode or according to an intra-slot repetition mode if the number of symbols in the PUCCH is less than a threshold value.

In some embodiments, when a format of the PUCCH is a short format, the base station is operable to configure the UE to transmit the plurality of repetitions of the PUCCH according to an intra-slot repetition mode or an inter-slot repetition mode.

In some embodiments, when a format of the PUCCH is a short format, the base station is operable to configure the UE to transmit the plurality of repetitions of the PUCCH only according to an intra-slot repetition mode.

As noted at 1510, the base station may transmit a plurality of repetitions of a PUCCH over one or more slots. In the present discussion, we refer to this plurality as the "first plurality" and this PUCCH as the "first PUCCH". In some embodiments, the method 1500 may also include, prior to said transmitting the first plurality of repetitions of the first PUCCH, transmitting, to the UE, configuration information indicating a first set and a second set of transmission parameters. After receiving the first plurality of repetitions of the first PUCCH, a second plurality repetitions of a second PUCCH may be received in one or more additional slots. The first set of transmission parameters may include a first timing advance and/or a first transmission power for the UE's transmission of the first plurality of repetitions of the first PUCCH, and the second set of transmission parameters may include a second timing advance and/or a second transmission power for the UE's transmission of the second plurality of repetitions of the second PUCCH.

In one set of embodiments, a method for operating a base station (BS) may include dynamically configuring a user equipment (UE) to perform repetition of transmission of a Physical Uplink Control Channel (PUCCH) by transmitting a Medium Access Control (MAC) message to the UE, wherein the MAC message includes a number of repetitions of the PUCCH to be transmitted by the UE.

In some embodiments, the MAC message may also include the cell ID of a serving cell to which the UE is to transmit the PUCCH repetitions.

In some embodiments, the MAC message may also include identification of a bandwidth part in which the UE is to transmit the PUCCH repetitions.

In some embodiments, the MAC message may also include a PUCCH resource ID for a PUCCH resource that is to be used by the UE to transmit the PUCCH repetitions.

In some embodiments, the MAC message may be used by the UE to update more than one PUCCH resource for said number of repetitions of the PUCCH.

In some embodiments, the MAC message may be used by the UE to update all PUCCH in a list of component carriers (CCs) with said number of repetitions of the PUCCH.

In some embodiments, the MAC message may be used by the UE to update all PUCCH in all bandwidth parts in a list of bandwidth parts with said number of repetitions of the PUCCH.

In one set of embodiments, a method for operating a user equipment (UE) may include transmitting N repetitions of a Physical Uplink Control Channel (PUCCH). The N repetitions of the PUCCH may be partitioned into M segments, with each of the M segments including a corresponding K of the N repetitions. Different segments of the M segments may be associated with different beams or precodings. For each segment, the K repetitions within the segment may be transmitted with the same associated beam or precoding.

In some embodiments, M and K may be configured by configuration information received from a network.

In some embodiments, the method may also include transmitting a preferred value of M and a preferred value of K to the network prior to said transmitting N repetitions of the PUCCH.

In one set of embodiments, a method for operating a user equipment (UE) may include: for a first group of repetition occasions, transmitting first repetitions of a Physical Uplink Control Channel (PUCCH) at the respective repetitions occasions of the first group, wherein the first repetitions are transmitted using a first set of transmission parameters; and for a second group of repetition occasions, transmitting second repetitions of the PUCCH at the respective repetitions occasions of the second group, wherein the second repetitions are transmitted using a second set of transmission parameters.

In some embodiments, the method may also include receiving configuration information indicating the first set and second set of transmission parameters.

In some embodiments, the first set of transmission parameters may include a first timing advance and/or a first transmission power, and the second set of transmission parameters may include a second timing advance and/or a second transmission power.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

Any of the methods described herein for operating a user equipment (UE) in communication with a base station (or transmission-reception point) may be the basis of a corresponding method for operating a base station (or transmission-reception point), by interpreting each message/signal X received by the UE in the downlink as a message/signal X transmitted by the base station (or transmission-reception point), and each message/signal Y transmitted in the uplink by the UE as a message/signal Y received by the base station (or transmission-reception point).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. An apparatus comprising:
a memory storing program instructions;
processor circuitry configured to execute the program instructions to:
receive, from a base station, configuration information indicating a first transmission power control parameter and a second transmission power control parameter;
provide for transmission to the base station, after receiving the configuration information, a first plurality of repetitions of a Physical Uplink Control Channel (PUCCH) over one or more slots, wherein a transmission power of one or more of the first plurality of repetitions of the PUCCH is based on the first transmission power control parameter; and
provide for transmission to the base station, after providing the first plurality of repetitions of the PUCCH, a second plurality of repetitions of the PUCCH in one or more additional slots, wherein a transmission power of one or more of the second plurality of repetitions of the PUCCH is based on the second transmission power control parameter.

2. The apparatus of claim 1, wherein the configuration information includes a first timing advance for transmission of the first plurality of repetitions of the PUCCH and a second timing advance for transmission of the second plurality of repetitions of the PUCCH.

3. The apparatus of claim 1, wherein the first transmission power control parameter comprises a transmission power level of one or more of the first plurality of repetitions of the PUCCH.

4. The apparatus of claim 1, wherein a first two of the first plurality of repetitions occur in a single slot of the one or more slots, and a first two of the second plurality of repetitions occur in a single slot of the one or more additional slots.

5. The apparatus of claim 1, wherein the first plurality of repetitions of the PUCCH consists of two repetitions of the PUCCH, and the second plurality of repetitions of the PUCCH consists of two repetitions of the PUCCH.

6. The apparatus of claim 1, wherein the first plurality of repetitions of the PUCCH is provided for transmission according to a first beam, and wherein the second plurality of repetitions of the PUCCH is provided for transmission according to a second beam, different from the first beam.

7. The apparatus of claim 6, wherein the configuration information indicates a spatial consistency pattern identifying the first beam and the second beam.

8. A non-transitory computer-readable memory medium storing program instructions executable by a processor to cause the processor to:
receive, from a base station, configuration information indicating spatial relation information identifying a first beam or precoding and a second beam or precoding;
provide, after receiving the configuration information, a first plurality of repetitions of a Physical Uplink Control Channel (PUCCH) for transmission to the base station over one or more slots according to the first beam or precoding; and
provide, after providing the first plurality of repetitions of the PUCCH, a second plurality of repetitions of the PUCCH for transmission to the base station over one or more additional slots according to the second beam or precoding.

9. The non-transitory computer-readable memory medium of claim 8, wherein the configuration information indicates a first timing advance for transmission of the first plurality of repetitions and a second timing advance for transmission of the second plurality of repetitions.

10. The non-transitory computer-readable memory medium of claim 8, wherein a first two of the first plurality of repetitions occur in a single slot of the one or more slots, and a first two of the second plurality of repetitions occur in a single slot of the one or more additional slots.

11. The non-transitory computer-readable memory medium of claim 8, wherein the first plurality of repetitions of the PUCCH consists of two repetitions of the PUCCH, and the second plurality of repetitions of the PUCCH consists of two repetitions of the PUCCH.

12. The non-transitory computer-readable memory medium of claim 8, wherein the first plurality of repetitions of the PUCCH is provided for transmission according to a first transmission power, and wherein the second plurality of repetitions of the PUCCH is provided for transmission according to a second transmission power.

13. The non-transitory computer-readable memory medium of claim 12, wherein the first transmission power is based on a first transmission power control indication included in the configuration information, and the second transmission power is based on a second transmission power control indication included in the configuration information.

14. An apparatus comprising:
   a memory storing program instructions;
   processor circuitry configured to execute the program instructions to:
      provide for transmission, to a user equipment (UE), configuration information indicating a first transmission power control parameter and a second transmission power control parameter;
      receive from the UE, after transmitting the configuration information, a first plurality of repetitions of a Physical Uplink Control Channel (PUCCH) over one or more slots, wherein a transmission power of one or more of the first plurality of repetitions of the PUCCH is based on the first transmission power control parameter; and
      receive from the UE, after receiving the first plurality of repetitions of the PUCCH, a second plurality of repetitions of the PUCCH in one or more additional slots, wherein a transmission power of one or more of the second plurality of repetitions of the PUCCH is based on the second transmission power control parameter.

15. The apparatus of claim 14, wherein the configuration information includes a first timing advance for transmission of the first plurality of repetitions of the PUCCH and a second timing advance for transmission of the second plurality of repetitions of the PUCCH.

16. The apparatus of claim 14, wherein the first transmission power control parameter comprises a transmission power level of one or more of the first plurality of repetitions of the PUCCH.

17. The apparatus of claim 14, wherein a first two of the first plurality of repetitions occur in a single slot of the one or more slots, and a first two of the second plurality of repetitions occur in a single slot of the one or more additional slots.

18. The apparatus of claim 14, wherein the first plurality of repetitions of the PUCCH consists of two repetitions of the PUCCH, and the second plurality of repetitions of the PUCCH consists of two repetitions of the PUCCH.

19. The apparatus of claim 14, wherein the first plurality of repetitions of the PUCCH is received according to a first beam, and wherein the second plurality of repetitions of the PUCCH is received according to a second beam, different from the first beam.

20. The apparatus of claim 19, wherein the configuration information indicates a spatial consistency pattern identifying the first beam and the second beam.

* * * * *